United States Patent [19]

Kirschner

[11] Patent Number: 4,958,698
[45] Date of Patent: Sep. 25, 1990

[54] METHOD FOR STEERING A MOTOR VEHICLE

[75] Inventor: Jochem Kirschner, Bischofsheim, Fed. Rep. of Germany

[73] Assignee: General Motors Corporation, Detroit, Mich.

[21] Appl. No.: 315,675

[22] Filed: Feb. 27, 1989

[30] Foreign Application Priority Data

Mar. 10, 1988 [DE] Fed. Rep. of Germany ....... 3807842

[51] Int. Cl.⁵ ............................................. B62D 6/00
[52] U.S. Cl. .................................. 180/140; 180/142; 280/91
[58] Field of Search ............... 180/140, 141, 142, 197; 280/91

[56] References Cited

U.S. PATENT DOCUMENTS

| 4,703,822 | 11/1987 | Kawamoto et al. | 180/140 |
| 4,719,981 | 1/1988 | Miyoshi | 180/140 |
| 4,781,261 | 11/1988 | Hyodo | 180/140 |
| 4,828,064 | 5/1989 | Furutani et al. | 180/140 |
| 4,840,389 | 6/1989 | Kawabe et al. | 180/140 |

FOREIGN PATENT DOCUMENTS 2153311A 8/1985 United Kingdom .
2157242A 10/1985 United Kingdom .

Primary Examiner—Charles A. Marmor
Assistant Examiner—Alan M. Kagen
Attorney, Agent, or Firm—Saul Schwartz

[57] ABSTRACT

The invention pertains to a process for steering a motor vehicle with a conventional steerable front axle and a steerable rear axle, in which the vehicle speed (V) and the front wheel steering angle (LWV) are detected in order to turn the rear wheels as a function of the vehicle speed (V) and the front wheel steering angle (LWV), with a limit angle (LWVgr) for the front wheel steering angle (LWV), being determined depending on the particular speed at which the vehicle is actually traveling (Vist). When a steering maneuver occurs, the actual front wheel steering angle (LWVist) is then continuously compared to the limit angle (LVWgr), and the rear wheels are turned in the same direction when the actual front wheel steering angle (LWVsit) is greater than or equal to the limit angle (LWVgr).

16 Claims, 2 Drawing Sheets

METHOD FOR STEERING A MOTOR VEHICLE

FIELD OF THE INVENTION

The invention pertains to a process for steering a motor vehicle with a conventionally steerable front axle and a steerable rear axle, in which the vehicle speed and the front wheel steering angle are detected in order to turn the rear wheels as a function of the vehicle speed and front wheel steering angle.

BACKGROUND OF THE INVENTION

A process of this kind for steering a motor vehicle is known from DE-OS 36 36 533, which pertains to a four-wheel steering system for a motor vehicle. In the known four-wheel steering system, the front wheels are turned in the usual way by means of a steering wheel actuated by the driver, which acts on a front wheel steering gear. A mechanical transfer device transfers the steering motion to a coupling drive which acts on a rear wheel steering gear in order to turn the rear wheels, with the coupling drive defining the steering angle ratio, namely, the ratio between rear wheel steering angle and front wheel steering angle.

In this case, the coupling drive can be adjusted, as a function of the vehicle speed, in such a way as to cause the rear wheels to turn in the opposite direction at low vehicle speeds and to cause the rear wheels to turn in the same direction at high vehicle speeds, with the steering angle ratio being set, when the rear wheels are both the opposite-direction and same-direction turning ranges, as a function of the vehicle speed.

In addition, the paper entitled "Four Wheel Steering System with Rear Wheel Steering Angle Controlled as a Function of Steering Wheel", S. Sano et al, SAE Technical Paper Series 860625, 1986, discloses a process for controlling a four-wheel steering system for a motor vehicle, in which the steering angle ratio is set as a function of the steering angle of the front wheels by means of a corresponding gear arrangement. In this case, advantage is taken of the fact that in normal driving, large front wheel steering angles essentially occur only at low vehicle speeds, while small front wheel steering angles essentially occur at relatively high vehicle speeds. Therefore, in this known process for controlling a four-wheel steering system, the steering angle ratio and therefore the rear wheel steering angle are also, to an approximation, set as a function of the vehicle speed.

In four-wheel steering systems controlled according to these known processes, the rear wheels of the motor vehicle also turn even at very small front wheel steering angles. At driving speeds above a predefined speed or at small front wheel steering angles, the rear wheels are turned in the same direction as the front wheels, while at driving speeds below the predefined speed or at large front wheel steering angles, the rear wheels turn in the same direction. As a result, the driving and steering characteristics of the vehicle are altered over the entire speed range.

In normal driving, when only low values of the transverse acceleration and yawing moment are reached, an additional rear wheel steering system to reduce these values is not only unnecessary by also disadvantageous, since the fact that the rear wheels turn in the same direction enhances the understeer characteristics of the vehicle and reduces steering responsiveness.

SUMMARY OF THE INVENTION

The invention is therefore based on the problem of creating a process of this type for steering a motor vehicle, without disadvantageous changes in its understeer characteristics and its steering responsiveness during normal driving.

According to the invention, this problem is solved by the fact that a limit angle for the front wheel steering angle is determined according to the speed at which the vehicle is actually traveling at the time, that the actual front wheel steering angle is continuously compared to the limit angle, and that the rear wheels are turned in the same direction when the actual front wheel steering angle is greater than or equal to the limit angle.

As a result, a process for steering a motor vehicle is created in which the driving characteristics of the motor vehicle remain unchanged as long as it is driven under normal driving conditions. However, as soon as driving situations occur in which steering of the rear wheels is desirable, the rear wheels are caused to turn in the same direction in order to reduce the transverse acceleration and yawing moment.

The process according to the invention, in which the vehicle speed and front wheel steering angle are monitored in order to activate the rear wheel steering system, makes it possible at any time for the transverse acceleration and yawing moment, which may be expected as a result of the steering maneuver, to be detected at the earliest possible moment, even before the transverse acceleration and yawing moment have actually affected the vehicle, since the vehicle reacts with a phase shift, i.e., with a time lag, to the input of a steering maneuver. As a result, with the process according to the invention, the turning of the rear wheels can be initiated even before the transverse acceleration and yawing moment of the motor vehicle becomes perceptible.

A development of the invention is characterized by the fact that below a predefined vehicle speed, the rear wheel are not turned in the same direction, with the predefined driving speed being in the range between 25 km/h and 40 km/h, preferably 30 km/h.

The result is that below a predefined vehicle speed, preferably below 30 km/h, turning of the rear wheels in the same direction, which reduces the steerability of the vehicle, is excluded, since in the speed range below 30 km/h, the probably transverse acceleration and yawing moment remain so low that unusual driving situations requiring an enhancement of the understeer characteristics of the vehicle cannot occur.

One preferred development of the invention provides for the limit angle to be reduced with increasing vehicle speed, with the limit being determined in such a way that steering of the rear wheels is initiated when the value of the transverse acceleration acting on the vehicle, to be expected on the basis of the vehicle speed and the set front wheel steering angle, reaches a predefined value.

Furthermore, an especially preferred embodiment of the invention provides for the predefined value of the transverse acceleration to be approximately 50% to 70%, preferably 55% to 65%, especially 60% of the greatest allowable transverse acceleration affecting the vehicle. As a result, the rear wheels turn only when the improvement produced by turning of the rear wheels becomes noticeable and is clearly perceived.

When driving on wet, snow-covered or icy roads (on which the vehicle can deviate from its intended path under lower transverse accelerations than on normal roads), a development of the invention provides that in order to determine the limit angle, the road condition influencing the greatest allowable transverse acceleration be detected, and that the limit angle be reduced to correspond to a degraded road condition.

Another development of the invention provides for an operating signal generated by a windshield wiper switch to be used to detect a degraded road condition. As a result, a deterioration in adhesion of the vehicle wheels on the road as a result of moisture is detected in an especially simple manner.

To allow detection of a deterioration in road conditions as reliably as possible and independent of the weather conditions at the time, another embodiment of the invention is characterized by the fact that a degradation in road condition is detected by means of a slip signal that is generated by a slip sensor arrangement associated with one of the vehicle wheels.

In addition to especially reliable detection of a degradation in road condition, this makes it possible not only to adjust the reduction in limit angle for the front wheel steering angle generally to the degraded road condition, but to implement the reduction as a function of the magnitude of the measured slippage of the wheels on the road.

By means of this precise recognition of critical road conditions, an optimum rear wheel steering angle can be set, which, under the low-friction conditions that cause the wheels to slip, guarantees optimum cornering force for the motor vehicle, while a rear wheel steering angle of this kind is unsuitable for higher-friction road conditions.

A practical embodiment of the invention for a motor vehicle with an anti-lock system provides for the slip signal to be derived from the anti-lock system.

An additional practical embodiment of the invention for a motor vehicle with a limited-slip drive system is characterized by the fact that the slip signal is derived from the limited-slip drive system.

This makes it possible to implement the process according to the invention in motor vehicles with anti-lock or limited-slip drive systems in a particularly simple and precise manner, without the need to provide additional speed or slippage sensor systems.

Another development of the invention is characterized by the fact that a temperature signal supplied by a temperature sensor is additionally used to detect a degraded road condition.

For a motor vehicle whose rear wheels are turned in the opposite direction from the front wheels in order to improve steerability in a low speed range, the invention provides for the rear wheels not to turn in a neutral speed range above the lower speed range and above the predefined vehicle speed, with the lower limit speed of the neutral speed range being approximately 3 km/h to 7 km/h, preferably 5 km/h, less than the predefined vehicle speed.

By means of this neutral speed range, in which the rear wheels do not turn at all, the differing conditions for turning the rear wheels in the same and the opposite direction can be clearly separated from one another.

Another embodiment of the invention envisions determining a second limit angle for the front wheel angle, dependent on the vehicle speed, which is less than the first limit angle, comparing the actual front wheel steering angle to the second limit angle if steering of the rear wheels in the same direction is activated and bringing the rear wheels back to their neutral straight-ahead position as soon as the actual front wheel steering angle is the same as or less than the second limit angle.

As a result, turning of the rear wheels is switched off as soon as the vehicle is, in practical terms, again traveling straight ahead, so that when the next steering movement occurs, a corresponding turning of the rear wheels can occur immediately if necessary.

An additional advantageous embodiment of the invention provides, in addition to selection of a reduced limit angle, for an increased steering angle ratio (between rear wheel steering angle and front wheel steering angle) to be defined for turning the rear wheels in the same direction when slippage of the vehicle wheels is detected (indicating a snow- or ice-covered road). The result of the increased steering angle ratio for turning the rear wheels in the same direction when driving on snow- or ice-covered roads, provided for according to the invention, is that in curves, a somewhat greater kingpin inclination is set, so that cornering on snow and ice is further improved.

BRIEF DESCRIPTION OF THE DRAWINGS

The invention will explained in more detail below using examples, with reference to the drawings, in which.

DESCRIPTION OF PREFERRED EMBODIMENTS

Figure 1:
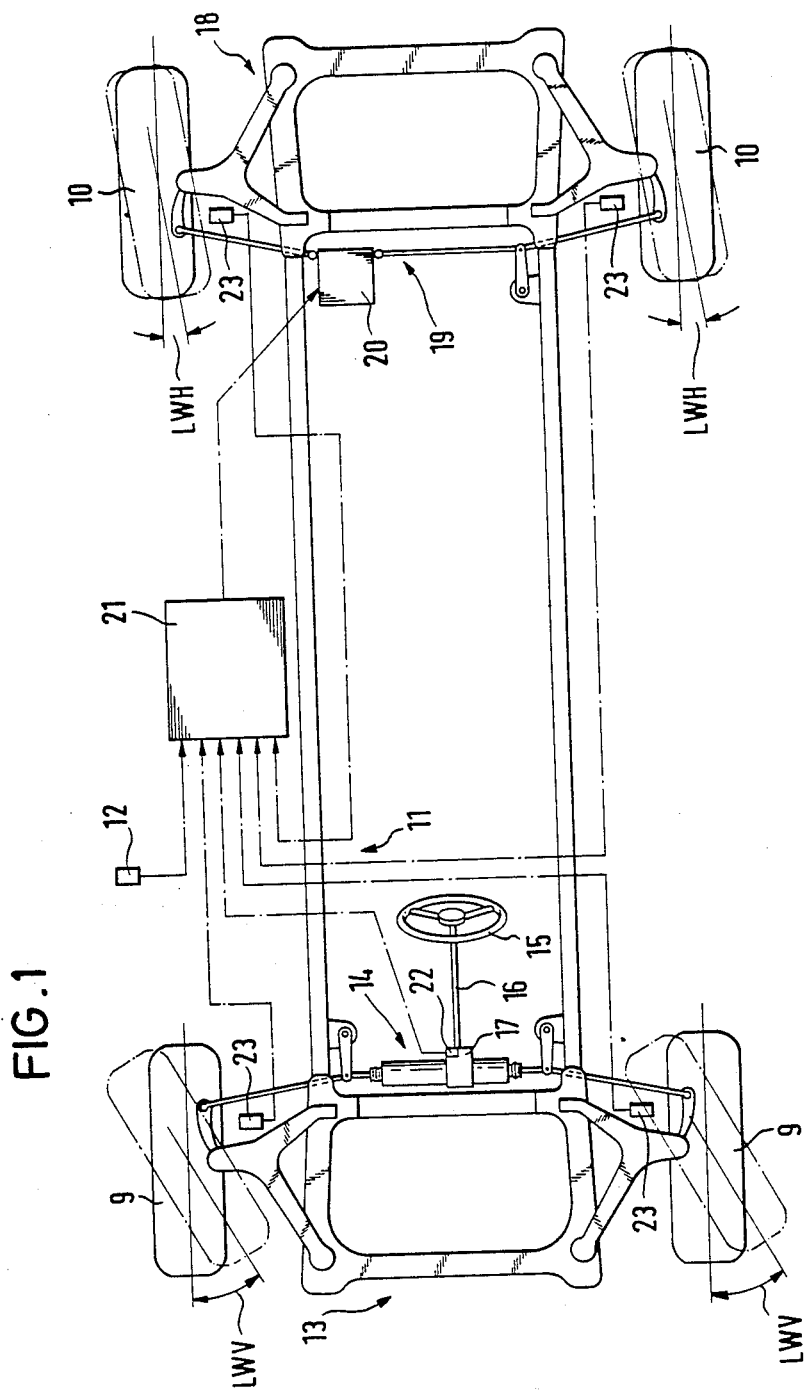
FIG. 1 shows a schematic top view of the running gear of a motor vehicle with a four-wheel steering system.

The running gear of a motor vehicle, shown in FIG. 1, has a front axle 13, the front wheels 9 of which are steerable by means of a conventional steering system 14 which can be acted upon by a steering wheel 15 through a steering column 16 and a steering gear 17.

A rear axle 18 carries rear wheels 10, which can be turned by means of a rear axle steering system 19, which comprises an electrical or hydraulic steering drive 20, which is controlled by an electronic steering system control circuit such as, for example, a microprocessor.

To detect the front wheel steering angle LWV, there is provided a steering angle sensor 22, which is associated, for example, with the steering gear 17 of the steering system 14 and which supplies a front wheel steering angle signal to the steering system control circuit 21.

To detect a slippage with respect to the road occurring at the wheels 9,10, there is associated with each of the front and rear wheels 9,10 a slip sensor 23 in a slip sensor arrangement 11, detecting the wheel rotation speed, with the output signals of the slip sensors 23 being supplied to the steering system control circuit 21. With this, the steering system control circuit 21 can detect slippage occurring at the wheels 9,10. At the same time, one of the output signals of the slip sensors 23, which detect the rotational speed of the individual wheels 9,10, can serve as the speed signal.

If the motor vehicle that is equipped with a four-wheel steering system controlled according to the process of the invention possesses an anti-lock or limited-slip drive system, slip signals can be derived from them and conveyed to the steering system control circuit 21.

It is then necessary, however, for an additional vehicle speed signal to be conveyed to the steering system control circuit 21, the said signal then being derived, for example, from the vehicle tachometer in a manner not illustrated.

The steering system control circuit 21 is additionally connected to a temperature sensor 12 which detects the outside temperature prevailing at the time and supplies a corresponding temperature signal. In addition, the steering system control circuit 21 receives a windshield wiper operation signal from the windshield wiper switch (not shown).

In order to steer a motor vehicle equipped with the steering system described above, first of all the vehicle speed V is continuously monitored. From the vehicle speed V, a limit angle LWVgr for the front wheel steering angle is determined as the switch-on criterion for the rear wheel steering system; with the transverse acceleration aq acting on the motor vehicle amounting to 60% of the maximum allowable transverse acceleration aq at which the motor vehicle, based on its specific running gear design, will just maintain its path without skidding, without additional rear wheel steering.

In this context, advantage is taken of the fact that the transverse acceleration aq is proportional to the square of the vehicle speed V and inversely proportional to the curve radius R, with the curve radius R being essentially inversely proportional to the front wheel steering angle LWV.

It is therefore possible to determine, from the vehicle-specific maximum value for allowable transverse acceleration aq, which also depends on the particular condition of the road, the limit angle LWVgr for the front wheel steering angle LWV, above which the rear wheels 10 can additionally be turned in the same direction to a rear wheel steering angle LWH. The additional turning of the rear wheels 10 in the same direction causes a reduction in both transverse acceleration and yawing moment.

Utilization of the front wheel steering angle LWV to detect the particular vehicle or running gear stress occurring during a steering maneuver makes it possible to determine the forces acting on the vehicle even before they actually affect the vehicle, since the vehicle always reacts to a steering maneuver input with a phase delay, i.e., with a time lag. These forces, which especially result in transverse acceleration and yawing moment, can therefore be counteracted even before they occur.

Figure 2:
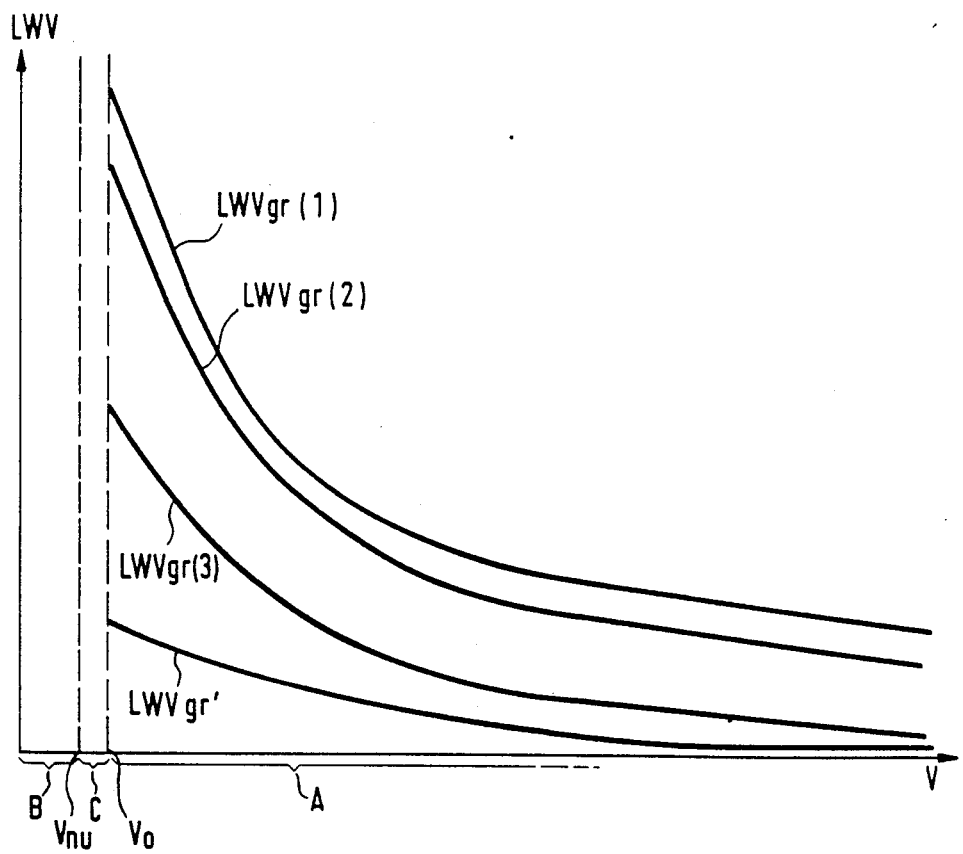
FIG. 2 shows a diagram in which the limit angle for the front wheel steering angle is plotted against the vehicle speed.

In the diagram in FIG. 2, in which the front wheel steering angle LWV is plotted against the vehicle speed V, the top curve shows the relationship between limit angle LWVgr (1) and the speed V for a normal road condition, i.e., for a dry road. Since the maximum allowable value of the transverse acceleration aq also depends strongly on the road condition — the same vehicle will threaten to skid at a lower value for transverse acceleration aq on a wet road than on a dry road — wet conditions also result in a smaller limit angle LWVgr (2) for the front wheel steering angle LWV, which is illustrated in the second curve from the top in FIG. 2. For snow-covered or icy roads, the maximum allowable value for transverse acceleration aq decreases further. This results correspondingly in an even smaller limit angle LWVgr (3) for the same vehicle speed V, the correlation of which with vehicle speed V is also shown as a curve in FIG. 2.

To select the correct relationship between limit angle LWVgr and vehicle speed V during driving, corresponding to the road condition, and thus to turn the rear wheels in each case starting at the correct front wheel steering angle LWV, the road condition is detected. The windshield wiper operation signal, temperature signal and slip signal, conveyed to the steering system control circuit 21, are used for this purpose.

Below a predefined vehicle speed Vo, which is preferably 30 km/h, the rear wheels 10 turn in the same direction, so that the limit angle LWVgr needs to be determined, and compared to the actual front wheel steering angle LWVist, only if the vehicle is traveling at a speed which is greater than the predefined vehicle speed Vo, i.e., when the speed being traveled is in speed range A (FIG. 2).

For slow speeds in a speed range B between 0 km/h and a lower limit speed Vno, it is advisable to turn the rear wheels 10 in a direction opposite the front wheels 9, to improve the steerability and maneuverability of the vehicle, especially getting in and out of parking spaces.

Between the lower speed range B, in which the rear wheels 10 are turned in the opposite direction, and the speed range A, in which the rear wheels are turned in the same direction as the front wheels 9 when the front wheel steering angle LWV exceeds the limit angle LWVgr, there is provided a neutral speed range C in which the rear wheels 10 do not turn. This neutral speed range C, the lower limit speed Vnu which is approximately 5 km/h lower than the predefined speed Vo, makes possible a clear separation of conditions for turning the rear wheels 10 in the same or the opposite direction.

To center the steering excursion of the rear wheels 10 in the same direction, a second limit angle LWVgr' is provided, which is selected as a function of the vehicle speed only and not the road condition. The second limit angle LWVgr' is advantageously selected in such a way that the steering excursion of the rear wheels 10 is centered when the vehicle has almost reached straight-ahead travel.

On snow-covered and icy roads, provisions can be made for the steering angle ratio LWHLWV between the rear wheel and front wheel steering angles LWH and LWV, respectively, to be greater than on a dry or wet road, if the lowest limit value curve (LWVgr(3)) is selected. As a result, a greater kingpin inclination of the rear wheels 10 is produced on snow and ice, which further increases the cornering ability of the vehicle.

Steering of a motor vehicle is controlled, according to the process described, as follows:

As soon as the vehicle is ready to drive, the vehicle speed V is continuously monitored. For this purpose, the steering system control circuit 21 receives a speed signal either from the slip sensors 23 of the slip sensor arrangement 11 or — in a manner not illustrated — from the tachometer.

As long as the vehicle is traveling at a relatively low speed V within the speed range B, for each front wheel steering angle LWV that occurs, the rear wheels 10 of the vehicle are turned to an opposite rear wheel steering angle LWH to improve the maneuverability of the vehicle.

As soon as the vehicle speed V reaches the neutral speed range C, the vehicle is steered exclusively by means of the front wheels 9. As soon as the vehicle speed has exceeded the predefined vehicle speed Vo which represents the lower limit of speed range A, a limit angle LWVgr for the front wheel steering angle is determined for each vehicle speed V.

If a steering maneuver is then input at a certain vehicle speed V in speed range A, the steering angle signal conveyed to the steering system control circuit 21 from the steering angle sensor 22, which represents a certain front wheel steering angle LWV, is compared to the limit angle LWVgr for the straight-ahead vehicle speed V. If the front wheel steering angle LWV that is input is smaller than the limit angle LWVgr, the rear wheels 10 do not turn, so that the vehicle is steered exclusively with the front wheels 9, as with a conventional steering system.

However, if the front wheel steering angle LWV that is input exceeds the limit angle LWVgr, the steering system control circuit 21 delivers a corresponding control signal to the steering drive 20, which thereupon causes the rear wheels 10 to turn in the same direction through a rear wheel steering angle LWH. The rear wheels can turn either in such a way that the rear wheels are turned through a fixed rear wheel steering angle LWH or so that a rear wheel steering angle LWH corresponding to a steering angle ratio LWHLWV is set, which is determined and predefined for each specific vehicle.

When the steering input for the front wheels 9 is then centered, with the front wheel steering angle LWV being continuously compared to the second limit angle LWVgr, which serves as the shut-off criterion for the rear wheel steering system, the turn of the rear wheels 10 is centered as soon as the front wheel steering angle LWV becomes less than the second limit angle LWVgr', namely, as soon as the vehicle is again traveling essentially straight ahead.

In this context, in order to determine the correct limit angle LWVgr for the front wheel steering angle LWV, corresponding to the particular road condition, a windshield wiper operation signal is sent to the steering system control circuit 21 for recognition of a wet road. If this operation signal is present at the steering system control circuit 11 for a certain period, allowing a conclusion that the windshield wiper is operating as a result of rain and not because the windshield washer system is operating, the steering system control circuit 21 selects a lower limit angle LWVgr (2), so that when a steering maneuver occurs, the rear wheels 10 turn earlier than during driving on a normal dry road, i.e., when no windshield wiper operation signal is present.

After the windshield wipers have been shut off, so that the windshield wiper operation signal is absent, the selection of a limit angle LWVgr (2) for a wet road can still be retained for a certain period, since the fact that the windshield wipers have been switched off does not indicate the roads immediately become dry.

To recognize critical road conditions such as snow-covered or icy roads, the system uses slip signals indicating a snow-covered or icy road, derived from anti-lock or limited-slip drive systems if they are present. At this point, a correspondingly even lower value for the limit angle LWVgr is selected, corresponding to curve LWVgr (3) in FIG. 2.

In vehicles which are equipped with neither an anti-lock nor a limited-slip drive system, a special slip sensor arrangement 11 can be provided, the output signals from which are evaluated by a separate electronic circuit or, as illustrated in FIG. 1, by the steering system control circuit, in order to generate a slip signal.

To achieve the most reliable detection of road conditions, the slip signal is combined with the temperature signal supplied by the temperature sensor 12, so that at temperatures below 0° C. it may be concluded that the slippage detected at the wheels can be attributed to a snow-covered or icy road.

If, following detection of a snow- or ice-covered road condition, the lowest limit angle LWVgr (3) — provided for this purpose — is selected, an increased steering angle ratio LWHLWV can be selected at the same time, so that when the rear wheel steering system is activated by the steering system control circuit 21, the steering gar 20 is acted upon in such a way that it produces a rear wheel steering angle LWH that is increased compared to the rear wheel steering angle LWH to be set on a dry road.

The rear wheel steering system is switched off as described above.

Because of the fact that the rear wheel steering system, depending on the particular road conditions, is actuated only for relatively large front wheel steering angles LWV, the rear wheel steering system is used only occasionally and not continuously, which reduces wear on the rear wheel steering system and increases the lifespan of the corresponding components.

The embodiments of the invention in which an exclusive property or privilege is claimed are defined as follows:

1. In a method of steering a motor vehicle with a conventionally steerable front axle and a steerable rear axle wherein vehicle speed and front wheel steering angle are detected in order to turn rear wheels in dependence on vehicle speed and front wheel steering angle, the improvement comprising the steps of, determining a limit steering angle (LWVgr) corresponding to a fraction of the maximum value of transverse acceleration before slip for the front wheel steering angle (LMV) at a vehicle speed (Vist) above a predetermined minimum vehicle speed (Vo) actually traveled at any given time, continuously comparing the actual front wheel steering angle (LWVist) with the limit steering angle (LWVgr), and turning the rear wheels in the same direction when the actual front wheel steering angle (LWVist) becomes greater than or equal to the limit steering angle (LMWgr).

2. Method according to claim 1, characterized in that below a given vehicle speed (Vo) the rear wheels are not tuned in the same direction.

3. The method recited in claim 1 wherein the given vehicle speed (Vo) is within the range from 25 km/h to 40 km/h, preferably 30 km/h.

4. The method recited in claim 3 wherein the limit steering angle (LMVgr) decreases with increasing vehicle speed (V).

5. Method according to claim 4, characterized in that the maximum angle (LMVgr) is determined in such a way that turning of the rear wheels is initiated when the value of transverse acceleration (aq) acting on the vehicle, which is to be expected according to the vehicle speed (Vist) and the set front wheel steering angle (LMVist), reaches a predetermined value.

6. The method recited in claim 4 wherein the fraction of transverse acceleration (aq) before slip is approximately 50-70%, preferably 55-65%, in particular 60% of the transverse acceleration (aq) acting on the vehicle at slip.

7. The method recited in claim 6 wherein the step of determining the limit steering angle (LMVgr) includes the step of detecting a road condition which affects the maximum permitted transverse acceleration and decreasing the limit steering angle (LMVgr) according to impaired road condition.

8. The method recited in claim 7 wherein an operating signal generated by a windscreen wiper switch is used to detect impaired road condition.

9. The method recited in claim 7 wherein a slip signal which is formed by a slip sensor assembly associated with the vehicle wheels is used to detect impaired road condition.

10. Method according to claim 9 for a motor vehicle with an anti-locking system, characterized in that the slip signal is derived from the anti-locking system.

11. Method according to claim 9 for a motor vehicle with a drive slip regulating system, characterized in that the slip signal is derived from the drive slip regulating system.

12. The method recited in claim 7 wherein a temperature signal delivered by a temperature sensor is used to detect impaired road condition in addition to an operating signal generated by a windscreen wiper switch.

13. Method according to any of the preceding claims for a motor vehicle whose rear wheels in a lower speed range are turned in an opposite direction to the front wheels to improve maneuverability, characterized in that there is no turning of the rear wheels in a neutral speed range above the lower speed range and below the given vehicle speed (Vo).

14. Method according to claim 13, characterized in that the lower limit speed (Vnu) of the neutral speed range is approximately 3–7 km/h, preferably 5 km/h less than the given vehicle speed (Vo).

15. The method recited in claim 1 and further including the steps of determining a second limit steering angle (LWVgr') for the front wheel steering angle (LWR) which is dependent on the vehicle speed and which is less than the first limit steering angle (LWVgr), comparing the actual front wheel steering angle (LMVist) with the second limit steering angle (LWVgr') when turning of the rear wheels in the same direction is actuated, and returning the rear wheels to their neutral straight-ahead position as soon as the actual front wheel steering angle (LMVist) is equal to or less than second limit steering angle (LMVgr').

16. The method recited in claim 9 and including the additional step of increasing the steering angle ratio (rear wheel steering angle to front wheel steering angle) on detection of slip of the vehicle wheel which indicates a snow-covered or icy road.

* * * * *